Jan. 27, 1959  R. A. EBERSOLE  2,870,514
PRESS
Filed Aug. 7, 1953  4 Sheets-Sheet 1

INVENTOR.
Robert A. Ebersole,
BY Schroeder, Merriam,
Hofgren & Brady
Atty's

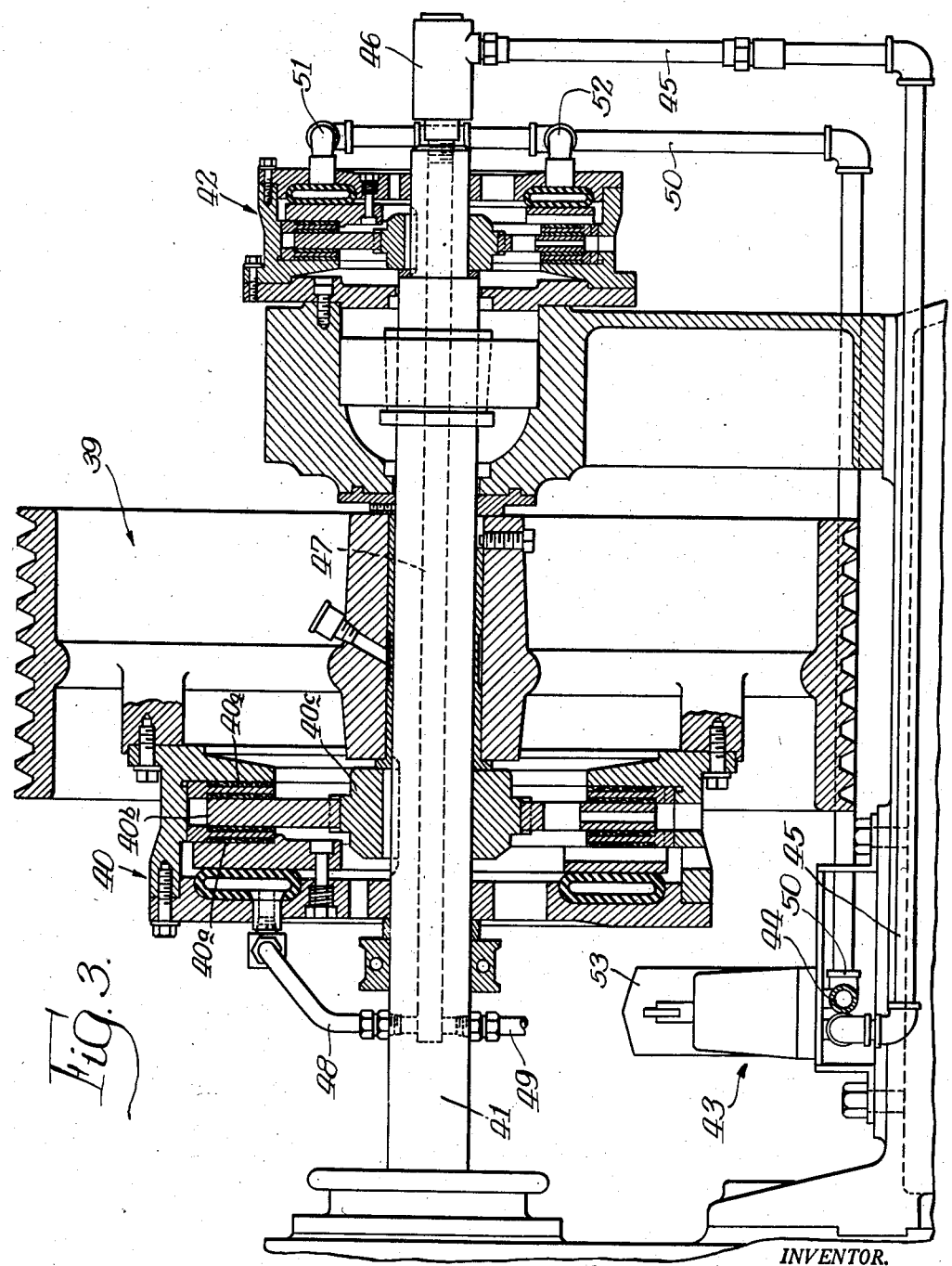

Jan. 27, 1959 R. A. EBERSOLE 2,870,514
PRESS
Filed Aug. 7, 1953 4 Sheets-Sheet 4
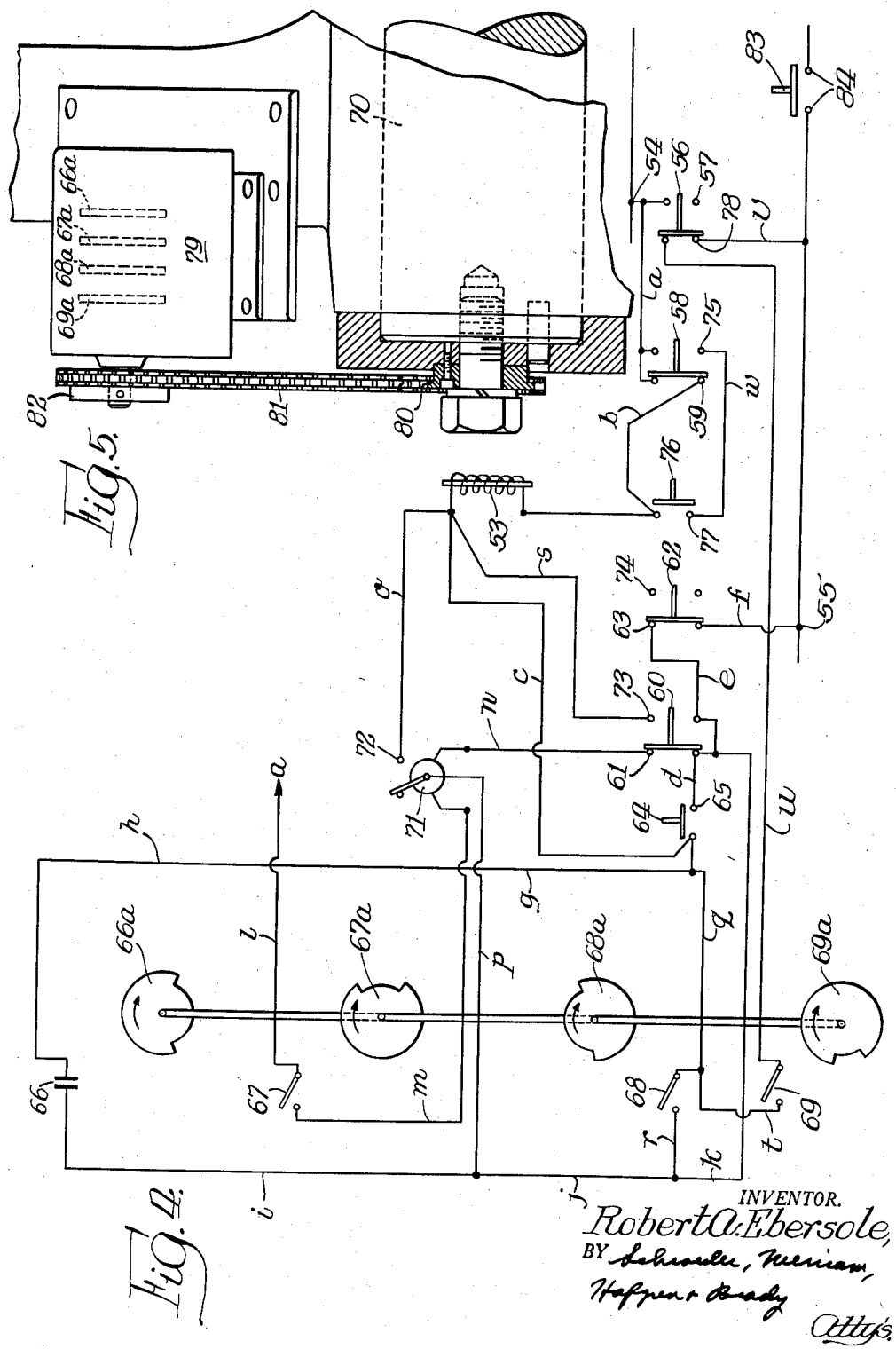
INVENTOR.
Robert A. Ebersole,
BY Schroeder, Merriam,
Hofgren & Brady
Atty's

United States Patent Office 2,870,514
Patented Jan. 27, 1959

2,870,514
PRESS

Robert A. Ebersole, Park Forest, Ill., assignor to Chisholm, Boyd & White Company, a corporation of Illinois Application August 7, 1953, Serial No. 372,850

2 Claims. (Cl. 25—90)

This invention relates to presses and other mechanisms for applying pressure to material in the treatment and formation thereof, and has the general purpose of improving and adding to the uses of such mechanisms.

The invention as here illustrated is particularly adapted for use in conjunction with a toggle arm type press, for example, of the general type shown in Flood Patents Nos. 985,153 and 987,124. It is the general object of this invention to produce a new and improved driving and control mechanism for a press together with novel methods of operating such a toggle arm type press.

One of the difficulties encountered in the manufacture of refractory bricks in dry pressing operations is pressure cracking. Pressure cracking has been described as the formation of a lamination or crack within the brick due to the separation or non-bonding of some of the particles therein. It has been determined that this pressure cracking is caused by air which is entrapped in the brick by the clay particles, this air being compressed along with the brick in the mold and being unable to escape while the brick is under pressure. When the forming pressure is released and the mold is opened, the entrapped air expands to atmospheric pressure, and this expansion of the air causes a separation of the grains in the molded mass. The pressure cracks thus formed cause a poor quality of brick, increase the tendency toward spalling, and also cause the molded mass to break more easily when it is handled in its green or unfired state resulting in heavy manufacturing losses during the firing period and even after firing.

Many methods have been proposed to overcome the effects of the entrapped air, one commonly employed system being the addition of vacuum equipment to the press for the purpose of removing air from the mold cavity during the pressing operation. The installation and addition of such equipment, however, is costly to install and maintain.

One of the principal features of this invention is to provide a press, together with control means therefor, which can be operated in a manner to eliminate pressure cracking. A further feature of the invention is the provision of control means for the driving mechanisms of the press so that the material in the mold may be partially compressed under a predetermined pressure, then such pressure is held for a short period of time, thereby allowing entrapped air to escape, further pressure then being applied in order to complete the compression of the material. The use of such a "pause" in the cycle of operation will produce a product of greater density and lower porosity by allowing time for the air to escape from the material while it is being held under pressure.

Other objects and features of the invention will be readily apparent from the following description and drawings, in which:

Fig. 3 is a vertical sectional view of the brake and clutch unit from the rear;

Fig. 4 is an electrical layout of the control circuit; and

Fig. 5 is an enlarged view, partly in section, showing details of the timing cam drive.

Figure 1:
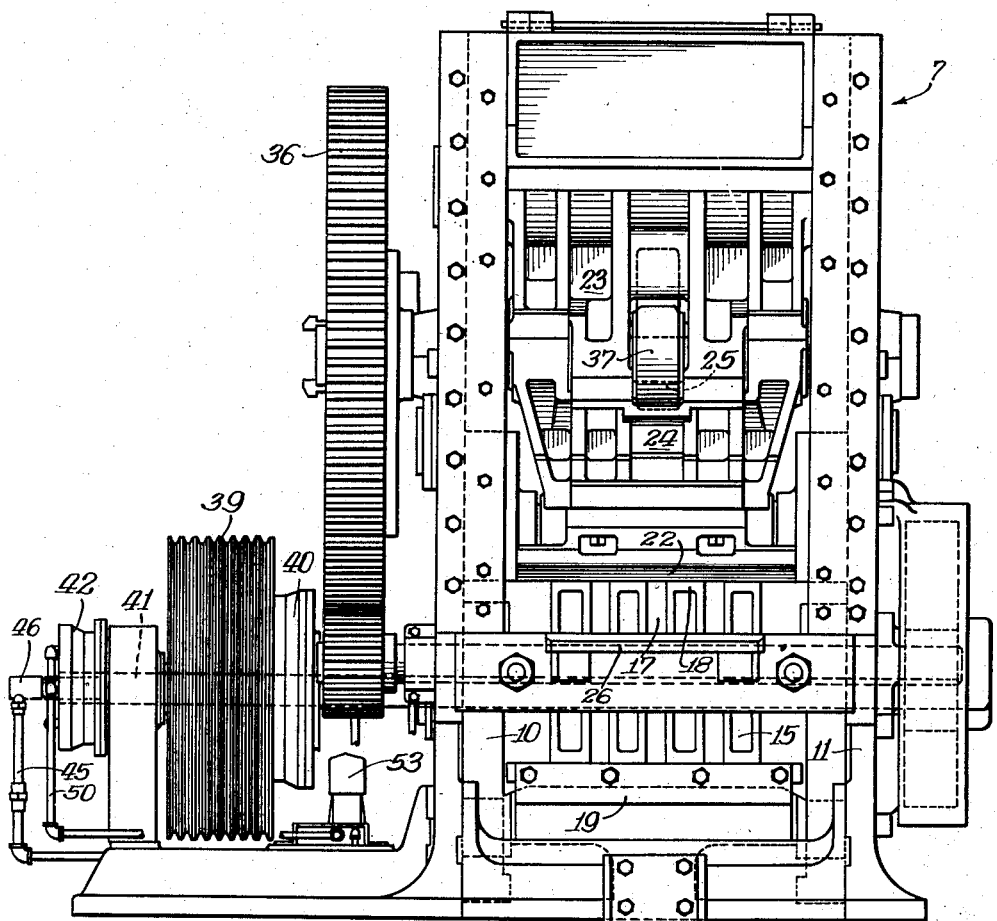
Fig. 1 is an elevational view of the front of a press embodying the invention.

While this invention is susceptible of embodiments in many different forms, there is shown in the drawings and will herein be described in detail one specific embodiment with the understanding that the present disclosure is to be considered as an exemplification of the principles of the invention and is not intended to limit the invention to the embodiment illustrated. The scope of the invention will be pointed out in the appended claims.

Figure 2:
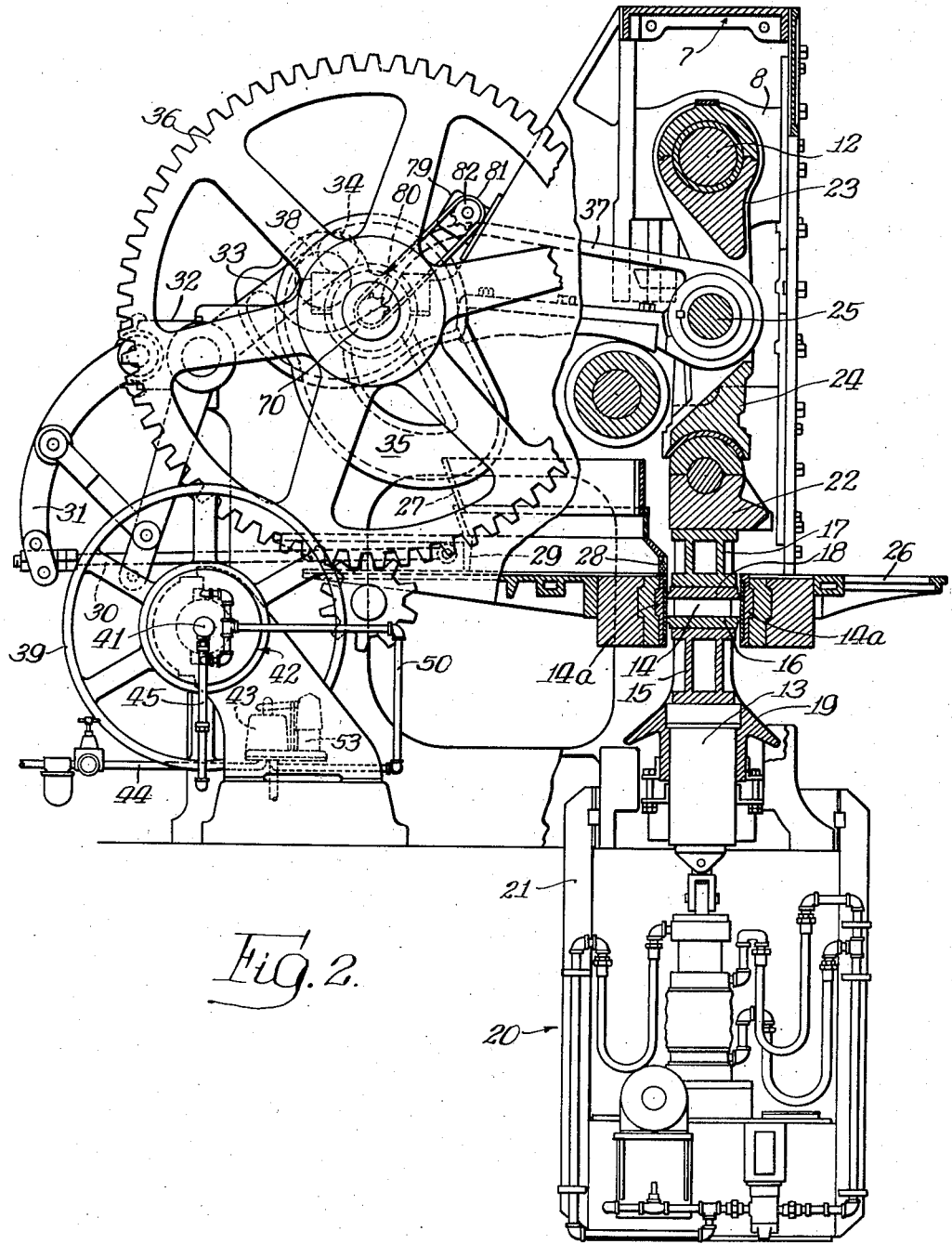
Fig. 2 is a vertical sectional view taken along line 2—2 of Fig. 1.

Referring to Figs. 1 and 2 of the drawings, there is shown a press of the general type illustrated in said Flood patents and as particularly shown in the application of Joseph Barkham filed June 11, 1952, as Serial No. 292,796, now Patent No. 2,716,900. The press includes a fixed main frame 7 in which there is vertically slidable in suitable guideways a subframe 8 including a pair of side bars 10 and 11. A shaft 12 is secured to the side bars and extends therebetween near the upper portion of the sub-frame and a beam 13, hereinafter referred to as the crosshead, extends between the side bars at the lower portion of the sub-frame.

Mounted on the main frame are four vertically upstanding side plates 14a, forming the sides of a rectangular mold 14. A lower plunger 15 carries a die plate 16 movable into the lower portion of the mold 14 to form the bottom thereof, while an upper plunger 17 carries an upper die plate 18 movable into the top of the mold to form the top. The lower plunger 15 is mounted upon a saddle 19 which is movable vertically on the lower crosshead 13. The position of the lower crosshead during certain portions of the operating cycle of the press is controlled by a hydraulic device 20 mounted in a channel support 21.

In the particular press shown for purposes of illustrating the invention, four upper plungers 17 are provided which cooperate with four lower plungers 15 and four molds 14 so that four bricks are formed in each cycle of the press.

Each upper plunger 17 is secured to an upper crosshead 22 which is secured to and movable vertically by swinging movement of a pair of toggle arms, the upper of which is designated 23 and the lower 24. The upper toggle arm is rotatably secured to the shaft 12 and the upper and lower toggle arms are each rotatably secured to an intermediate shaft 25 to form the toggle.

The press is provided with a table 26 upon which is horizontally slidable an open-bottomed hopper 27 adapted to contain a supply of material to be pressed. The hopper has a front wall 28 and a rear wall 29 and means are provided for reciprocating the hopper over the upper surface of the table so as to carry material therein over the mold 14 when the upper plunger 17 is above the mold so that the material in the hopper may drop by gravity into the mold, with the quantity of the material falling into the mold being determined by the position at that time of the lower plunger 15. For the purpose of reciprocating the hopper, there is provided a rod 30 connected to a link 31 which in turn is pivotally supported upon a member 32 movable through the operation of the cam follower arm 33 connected thereto which carries a cam follower 34 riding in a cam groove 35 secured to the main drive gear 36. Intermediate shaft 25, to which the upper and lower toggle arms 23 and 24 are rotatably secured, is also secured at its center portion to a crank 37, the other end of which is rotatably secured to a crank pin 38 on the main drive gear 36. It will be understood from the foregoing that as the crank 37 is oscillated with rotation of the drive gear, the toggle arms are swung toward and finally through dead center and thus the plunger 17 is moved into the mold 14 under great pressure.

For the purpose of adjusting the depth of the mold during the filling operation (thus determining the quantity of material introduced therein), the hydraulic control device 20 is provided. This device is described in detail in my copending application filed June 16, 1953, as Serial No. 361,957, now Patent No. 2,704,874.

The press receives its drive from a motor (not shown) which drives the pulley drum 39 through a plurality of V belts. The drum 39 is connectable through the medium of an air operated disk clutch 40 to the driven shaft 41. Means in the form of an air (pneumatically) operated brake 42 is provided for braking the shaft 41 for bringing the press to a positive and rapid stop. Rotation of the drum 39 causes rotation of the clutch 40 and its associated clutch plates 40a. Upon pressure being directed to the clutch, the plates are pressed into engaging contact with a driven plate member 40b. The plate member 40b is in mesh with a member 40c attached to the driven shaft 41. Thus, upon engagement of the clutch, the drum 39 will drive the driven shaft 41. The brake 42 is stationary except for the driven shaft 41 rotating a member 42a in mesh with a driven plate member 42b. The application of pressure to the brake causes the stationary brake plates 42c to engage and stop the plate member 42b, thus stopping the rotation of the driven shaft 41. The clutch and brake units may be of usual construction and thus will not be further described in detail herein.

A four-way, solenoid operated, air valve 43 is provided for operating the clutch and brake units. Air pressure from a suitable source is directed to the inlet 44 of the valve and then, according to the position of the valve to either an outlet connected to the clutch unit or an outlet connected to the brake unit. The clutch connected outlet communicates with one end of a pipe 45 (Fig. 3) the other end of which is connected to a rotary union 46 connecting with a drilled passage 47 in the drive shaft 41. Pipes 48 and 49 connect with the passage 47 and with the pneumatically operated parts of the clutch 40 for operating the clutch. The brake connected outlet of the valve 43 communicates with one end of a pipe 50 the other end of which is connected to pipes 51 and 52 which supply the pneumatically operated parts of the brake.

As was stated hereinbefore, one of the principal features of this invention is to provide the press with a control means for operation in a manner to eliminate pressure cracking. It has been found that by partially compressing the material in the mold, then holding this compression for a short period of time, the entrapped air in the material is allowed to escape. For such finite control over the compression of the material in the mold, a control circuit for the operation of the valve 43 is provided. The circuit (Fig. 4) is energized by connecting terminals 54 and 55 to a source of power, for example, 110 volts A. C. The control circuit shown makes possible the operation of the press in any one of four ways.

The first method of operation is the "pause" or "dwell" operation. By this method of operation the toggle arms are drawn toward dead center, thus partially compressing the material in the mold; then they are halted at a predetermined position for a period of time; then they are drawn completely through dead center in order to complete the compression of material in the mold. For this operation the selector switch 56 is set in the "off" position contacting the terminals 57; the selector switch 58 is set in the "run" position contacting the terminals 59; the selector switch 60 is set in the "dwell" position contacting the terminals 61, and the selector switch 62 is set in the "start" position contacting the terminals 63. The circuit is now complete but for the momentary contact of the selector switch 64 being placed in the "momentary start" position contacting the terminals 65. For the purpose of obtaining the "pause" or "dwell" operation of the press four mechanically operated switches 66, 67, 68, and 69 are placed in the circuit and are opened and closed by a series of cams 66a, 67a, 68a, and 69a which are operated off the main gear shaft 70 (Fig. 5).

The rotary cams 66a, 67a, 68a, and 69a are located in the rotary cam limit switch 79 (Fig. 5). The switch is operated off the main gear shaft 70 by drive through the sprocket 80, the chain 81 and the sprocket 82. The selector switch 64 is placed in the "momentary start" position long enough for the circuit to become completed, thereby energizing the solenoid 53 and starting the press operation. The completed circuit is shown by lines $a$, $b$, $c$, $d$, $e$ and $f$. When the solenoid 53 is energized the valve 43 allows air pressure to flow through the pipe 45, the rotary union 46, the drilled passage 47, and the pipes 48 and 49 to the clutch 40, thus engaging the clutch 40 and establishing a driving connection from the drum 39 through the clutch 40 to the drive shaft 41. This action causes the toggle arms 23 and 24, being driven through the power train outlined before, to begin moving toward dead center.

Before the selector switch 64 is released, the cam 66a operates to close the switch 66, thereby retaining a completed circuit through lines $a$, $b$, $c$, $g$, $h$, $i$, $j$, $k$, $e$ and $f$. During this time, the upper and lower toggle arms 23 and 24 are being drawn further toward dead center, moving the upper crosshead 22 downward and partially compressing the material in the mold. Just before the cam 66a opens the switch 66, the cam 67a closes the switch 67, thereby again retaining a completed circuit through lines $a$, $l$, $m$, $n$, $e$ and $f$ and energizing the time delay motor relay 71. When the switch 66 is opened, the solenoid 53 is de-energized as it is not then in the motor circuit. De-energizing the solenoid 53 causes the valve 43 to release the air pressure in the clutch 40, thus disengaging the drive from the pulley drum 39 to the gear shaft 41. Simultaneous with the release of the clutch 40, the valve 43 transmits air pressure through lines 50, 51 and 52 to the air operated brake 42 which immediately stops the press. At this point the upper and lower plungers 15 and 17 are at a predetermined compression position. The amount of time that the motor relay 71 takes to close is determined by a manual setting of the relay motor. The circuit completed by the closing of the motor relay 71 is through lines $a$, $b$, $c$, $p$, $j$, $k$, $e$ and $f$. The completion of this circuit energizes the solenoid 53 so as to release the air pressure from the brake 43, disengaging the brake and transmits air pressure to the clutch 40 to connect the drum 39 to the gear shaft 41 so as to again begin the press operation. Immediately after the motor relay completes the circuit just described, which of course will start operation of the shaft 70, the cam 68a operates to close switch 68, completing a holding circuit through lines $a$, $b$, $c$, $q$, $r$, $k$, $e$ and $f$. A circuit is also completed through lines $a$, $b$, $c$, $q$, $r$, $j$, $p$, $n$, $e$ and $f$, causing the motor relay to operate in the opposite direction opening the circuit. However, the closed switch 68a retains the solenoid 53 energized. The toggle arms are drawn completely through dead center completing the compression of the material in the mold and then are moved apart to their primary position. When the cam 68a opens the switch 68, the cam 66a has not yet closed the switch 66; therefore the circuit remains open and the solenoid 53 is de-energized, thus releasing the clutch 40, applying the brake 42, and stopping the press with the toggle arms in their most outward position. The toggle arms maintain this position until the selector switch 64 is again placed in the "momentary start" position to cause the toggle arms to move through another cycle.

There may be instances when the "pause" or "dwell" operation is not necessary or required. For this purpose a second method is provided which operates the press continuously. For "continuous" operation, the selector switch 56 is set in the "off" position contacting the terminals 57; the selector switch 58 is set in the "run" position contacting the terminals 59; the selector switch 60 is set in the "continuous" or "inch" position contacting the terminals 73, and the selector switch 62 is set in the "start" position contacting the terminals 63. By placing the switches in the aforementioned positions, a circuit is completed through lines a, b, s, e and f and the solenoid will be energized. Thus the press will operate continuously until the selector switch 62 is placed in the "stop" position contacting the terminals 74 which opens the circuit, de-energizes the solenoid 53 causing the valve 43 to release the air pressure to the clutch.

For various reasons, particularly during start up of the press, it may be desired to merely move the toggle arms a very short distance. For this purpose a third method of operation is provided called the "inch" method. For inching, the selector switch 56 is placed in the "off" position contacting terminals 57; the selector switch 58 is placed in the "inch" position contacting the terminals 75; the selector switch 60 is placed in the "continuous" or "inch" position contacting terminals 73, and the selector switch 62 is placed in the "start" position contacting terminals 63. The press is now ready for inching. Placing the selector switch 76 in the "inch momentary" position contacting terminals 77 will start the press completing the circuit through lines a, w, s, e and f. This action energizes the solenoid 53 and engages the clutch 40 in the manner outlined before. Releasing the switch 76 will open the circuit and stop the press de-energizing the solenoid 53, which causes the valve 43 to release the air pressure to the clutch 40 and redirect the air pressure to the brake 42.

As stated in the first method of operation, it was necessary at the beginning of each cycle to press the "momentary start" selector switch 64. There may be times when it is desirous to eliminate the necessity of the presence of a person to place the selector switch 64 in the "momentary start" position or when a continuous "pause" or "dwell" cycle is wanted. For this purpose a fourth method of operation is provided, that being the automatic cycle. For the "automatic" cycle the selector switches are placed in the exact position as for the first method ("pause" or "dwell") of operation, with the exception that the selector switch 56 is placed in the "automatic" position contacting terminals 78 instead of the "off" position where the switch contacted terminals 57. The "pause" or "dwell" operation is then obtained; however, where in that operation the circuit was closed and the toggle arms stopped at their most extended position due to the fact that cam 66a did not close the switch 66 before the cam 68a opened the switch 68, in the "automatic" cycle the cam 69a closes the switch 69 thereby forming a circuit a, b, c, g, t, u, v before the cam 68a opens the switch 68 and the cam 66a closes the switch 66 before the switch 69 opens, thereby keeping the circuit complete throughout the entire cycle of the toggle arms. The circuit when switch 65 is closed is complete through lines a, b, c, q, r, k, e and f. In other words, the selector switch 64 does not need to be placed in the "momentary start" position contacting terminals 65 at various intervals in order to keep the press cycling.

The selector switch 62 may be placed in the "stop" position contacting terminals 74 at any time of emergency in order to stop the press in any operation except "automatic." An emergency switch 83 may be opened from its contact terminals 84 to stop the press when in "automatic." It should again be noted that the four way solenoid operated air valve 43 when energized is opened to the clutch 40 and when de-energized is spring returned and opened to the brake 42. This insures braking in case of any current failure.

Thus, by the control circuit controlling the operation of the solenoid 53 in the "pause" or "dwell" method the material in the mold may be (1) compressed to a certain degree, (2) then the compression halted for a predetermined period of time in order to allow the entrapped air to escape, (3) then the compression completed, and (4) the upper and lower plungers separated in order to permit the discharging of the compressed material. In addition to the "pause" or "dwell" operation, the control circuit also provides a "continuous" operation, "inch" operation and "automatic" operation.

I claim:

1. In a press of the character described, a main frame, means on the frame forming a mold, a toggle frame slidably mounted on the main frame and carrying a lower plunger, a pair of toggle arms on the toggle frame and carrying an upper plunger, said plungers being relatively movable toward each other in the mold as said toggle arms move toward dead center for compressing material in the mold, driving means, means connecting the driving means to the toggle arms including a clutch and a brake, means for actuating said clutch and said brake, electromagnetic means for controlling said actuating means, and rotary cam means on said press operated by said connecting means for cyclically operating said electromagnetic means in timed relation to movement of said toggle arms and operable to control said connecting means to sequentially clutch the driving means to the connecting means to move said toggle arms to cause said plungers to move toward each other to a first position in which said plungers partially compress the material in said mold, to brake said connecting means to hold said plungers for a period in said first position sufficient to allow compressed air to escape from the partially compressed material, to reclutch the driving means to the connecting means to move said toggle arms to dead center to move said plungers toward each other to a second position where further compression is exerted on the material, and then to move said toggle arms away from dead center so as to move said plungers apart to a third position permitting the discharge of the compressed material.

2. In a press of the character described, a main frame, means on the frame forming a mold, a toggle frame slidably mounted in the main frame and carrying a lower plunger, a pair of toggle arms on the toggle frame and carrying an upper plunger, said plungers being relatively movable toward each other in the mold as said toggle arms move toward dead center for compressing material in the mold, driving means, means connecting said driving means to the toggle arms for moving said toggle arms, clutch means for connecting and disconnecting said driving means from said connecting means, brake means for stopping said connecting means, valve means for operating the clutch and brake means connected to a source of fluid, electromagnetic means for controlling said valve means, adjustable time delay means in series with said electromagnetic means, a circuit for said electromagnetic means and said delay means, electric switch means for opening and closing said electric circuit, and rotary cam means operated by said connecting means for cyclically operating said switch means in timed relation to movement of said plungers to continuously operate the press through a cycle in which the plungers are stopped for a time in a compression position short of dead center for the toggle arms and then the toggle arms pass through dead center to finally compress the material, said cam means including a cam adjustable so as to determine the stopping position of the plungers.

References Cited in the file of this patent
UNITED STATES PATENTS

| | | |
|---|---|---|
| 1,192,057 | Grath | July 25, 1916 |
| 1,269,909 | Yingling | June 11, 1918 |
| 1,646,872 | Prouty | Oct. 25, 1927 |
| 1,911,152 | Hever | May 23, 1933 |
| 1,993,413 | Mellon | Mar. 5, 1935 |
| 2,334,082 | Gates | Nov. 9, 1943 |
| 2,434,849 | Hess | Jan. 20, 1948 |
| 2,577,641 | Wissman | Dec. 4, 1951 |
| 2,600,667 | Mason | June 17, 1952 |

FOREIGN PATENTS

| | | |
|---|---|---|
| 499,565 | Great Britain | Jan. 25, 1939 |